(No Model.) 11 Sheets—Sheet 1.

R. S. GRIFFIN & J. W. COPELAND.
MACHINE FOR MAKING WINDOW BLINDS.

No. 592,953. Patented Nov. 2, 1897.

Witnesses;
W. B. Nourse.
C. Forrest Wesson.

Inventors,
Robert S. Griffin
John W. Copeland.
By H. A. Barker, Att'y (No Model.) 11 Sheets—Sheet 2.
R. S. GRIFFIN & J. W. COPELAND.
MACHINE FOR MAKING WINDOW BLINDS.
No. 592,953. Patented Nov. 2, 1897.

(No Model.) 11 Sheets—Sheet 3.

R. S. GRIFFIN & J. W. COPELAND.
MACHINE FOR MAKING WINDOW BLINDS.

No. 592,953. Patented Nov. 2, 1897.

Witnesses,
W. B. Nourse.
C. Forrest Wesson.

Inventors,
Robert S. Griffin
John W. Copeland
By A. A. Barker, Atty (No Model.) 11 Sheets—Sheet 4.

R. S. GRIFFIN & J. W. COPELAND.
MACHINE FOR MAKING WINDOW BLINDS.

No. 592,953. Patented Nov. 2, 1897.

Witnesses:
W. B. Nourse.
C. Forrest Wixson.

Inventors:
Robert S. Griffin
John W. Copeland
By H. A. Barker Att'y.

(No Model.) 11 Sheets—Sheet 6.

R. S. GRIFFIN & J. W. COPELAND.
MACHINE FOR MAKING WINDOW BLINDS.

No. 592,953. Patented Nov. 2, 1897.

Witnesses:
W. B. Nourse,
C. Forrest Wisson

Inventors:
Robert S. Griffin
John W. Copeland
By A. A. Barker. Att'y (No Model.) 11 Sheets—Sheet 7.
R. S. GRIFFIN & J. W. COPELAND.
MACHINE FOR MAKING WINDOW BLINDS.
No. 592,953. Patented Nov. 2, 1897.
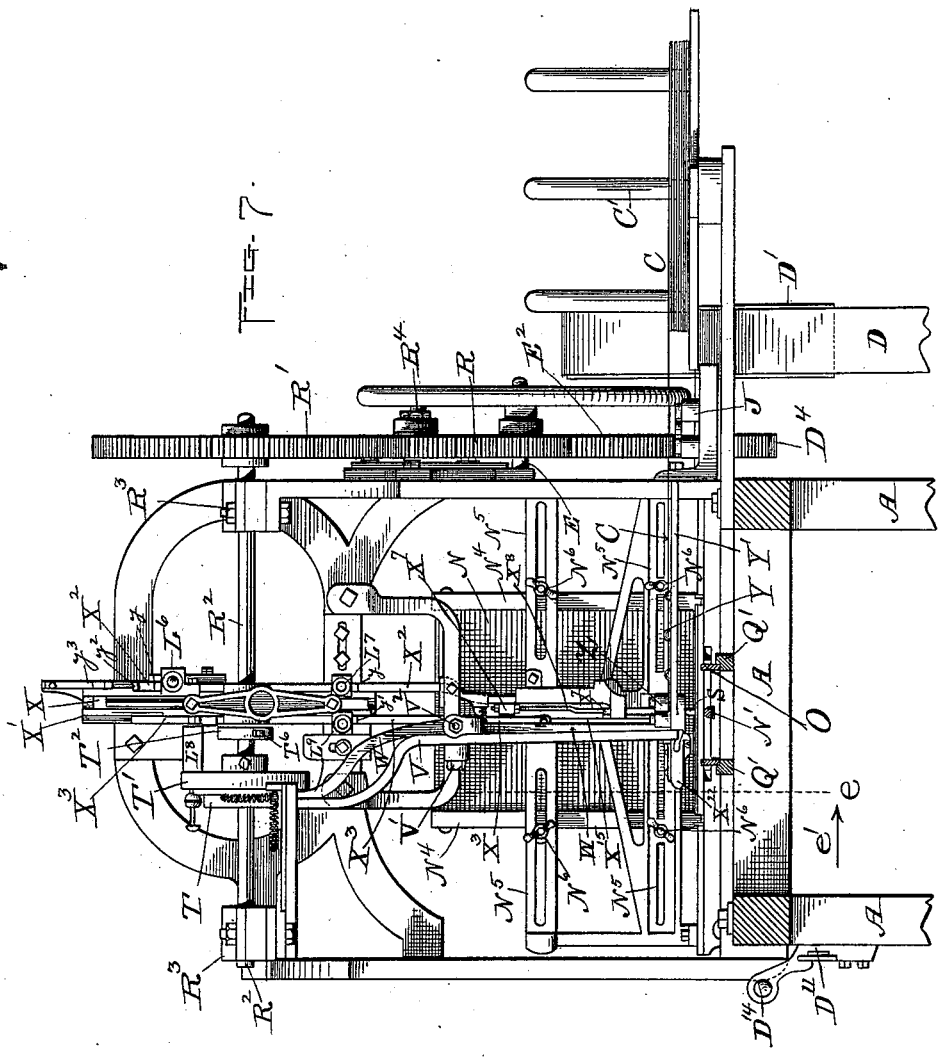

(No Model.) 11 Sheets—Sheet 8.
R. S. GRIFFIN & J. W. COPELAND.
MACHINE FOR MAKING WINDOW BLINDS.
No. 592,953. Patented Nov. 2, 1897.
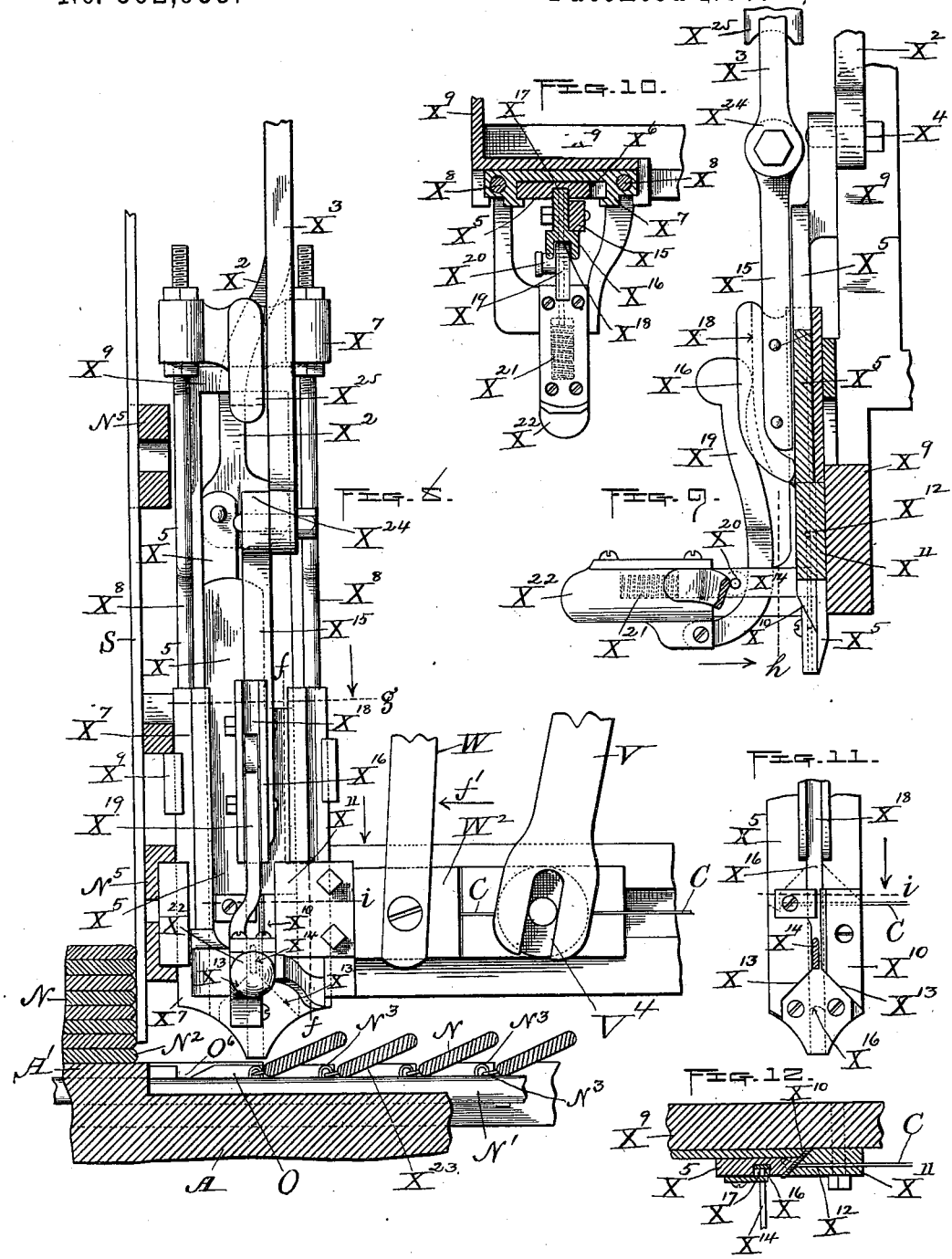
Witnesses:
W. B. Nourse,
C. Forrest Wisson.
Inventors:
Robert S. Griffin
John W. Copeland
By A. A. Barker, Atty.

(No Model.) 11 Sheets—Sheet 9.
R. S. GRIFFIN & J. W. COPELAND.
MACHINE FOR MAKING WINDOW BLINDS.
No. 592,953. Patented Nov. 2, 1897.
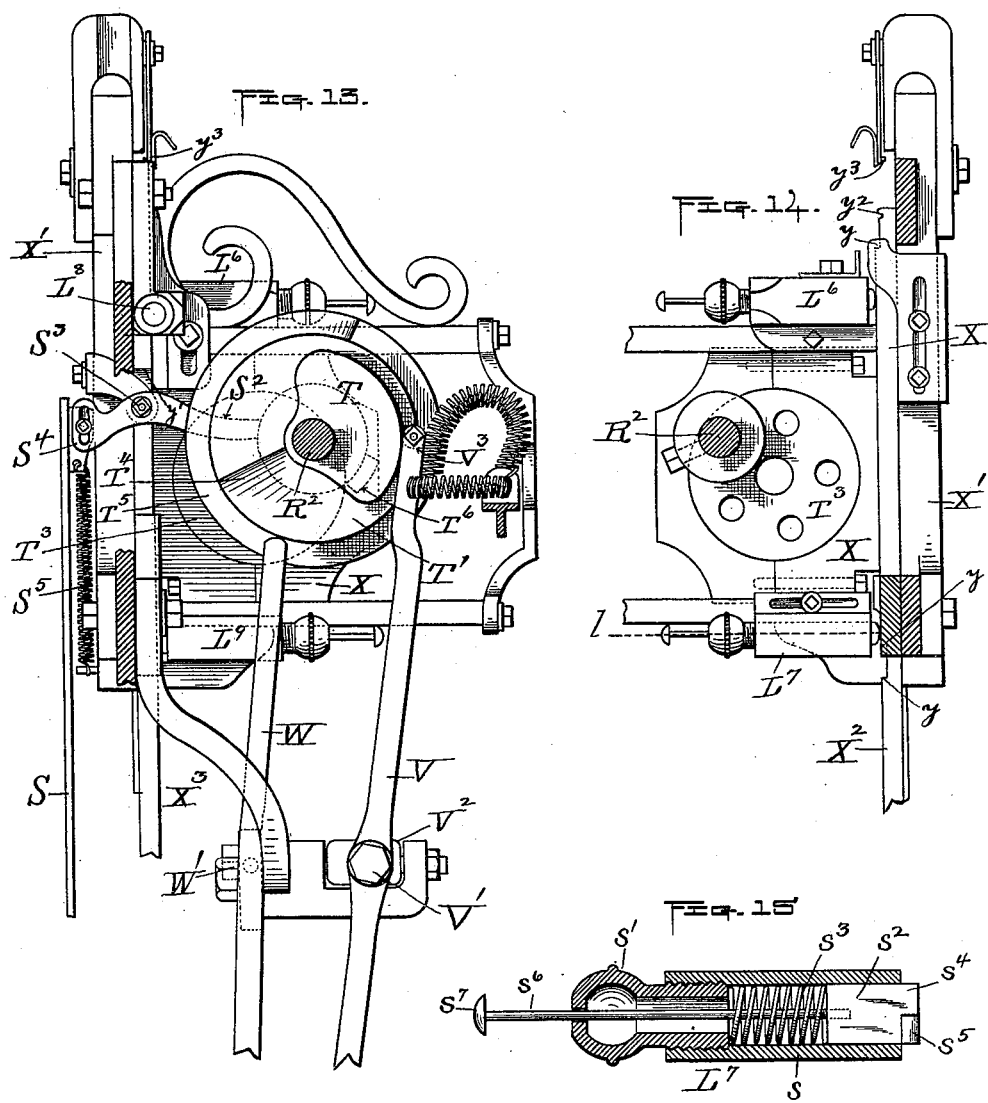
Witnesses:
W. B. Nourse.
C. Forrest Hesson.
Inventors:
Robert S. Griffin
John W. Copeland.
By A. A. Barker, Att'y

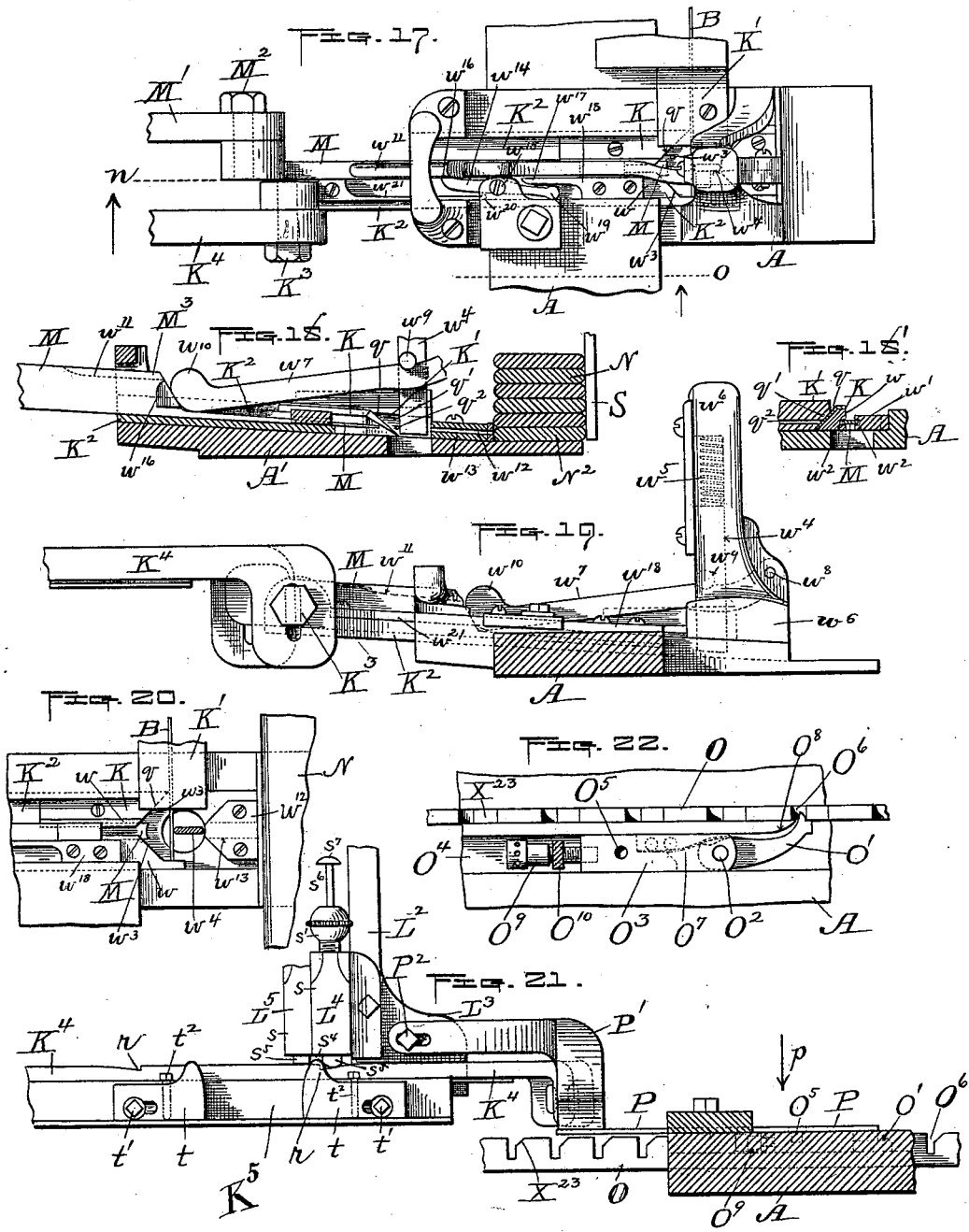

(No Model.) 11 Sheets—Sheet 11.

R. S. GRIFFIN & J. W. COPELAND.
MACHINE FOR MAKING WINDOW BLINDS.

No. 592,953. Patented Nov. 2, 1897.

Witnesses,
W. B. Nourse.
C. Forrest Wesson.

Inventors,
Robert S. Griffin
John W. Copeland
By A. A. Barker Atty

UNITED STATES PATENT OFFICE.

ROBERT S. GRIFFIN AND JOHN W. COPELAND, OF WORCESTER, MASSACHUSETTS.

MACHINE FOR MAKING WINDOW-BLINDS.

SPECIFICATION forming part of Letters Patent No. 592,953, dated November 2, 1897.

Application filed January 2, 1896. Serial No. 574,094. (No model.)

*To all whom it may concern:*

Be it known that we, ROBERT S. GRIFFIN and JOHN W. COPELAND, of the city and county of Worcester and State of Massachusetts, have invented certain new and useful Improvements in Machines for Making Window-Blinds; and we do hereby declare that the following is a full, clear, and exact description thereof, reference being had to the accompanying drawings, forming a part of this specification, in which—

Figure 1:
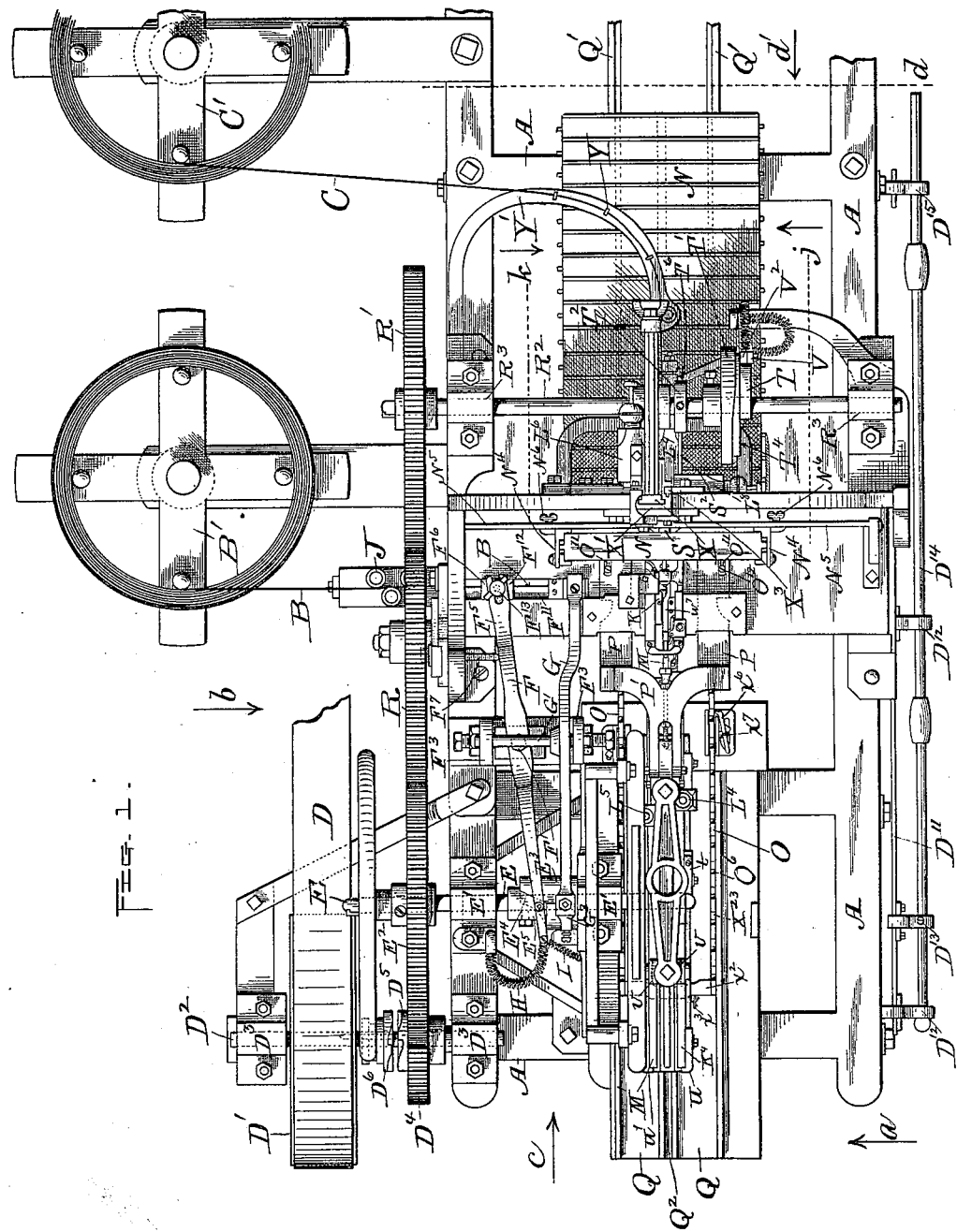
Figure 2:
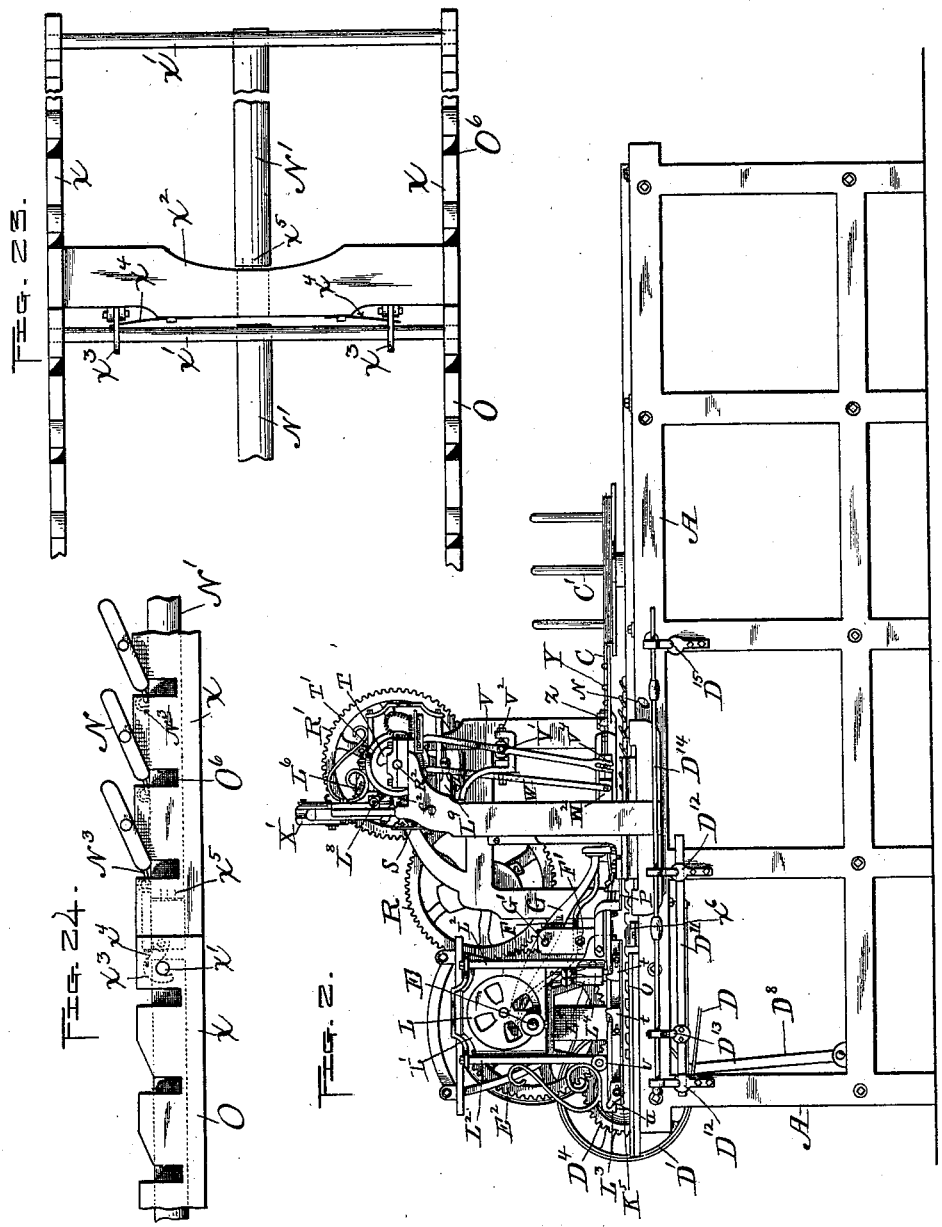
Figure 3:
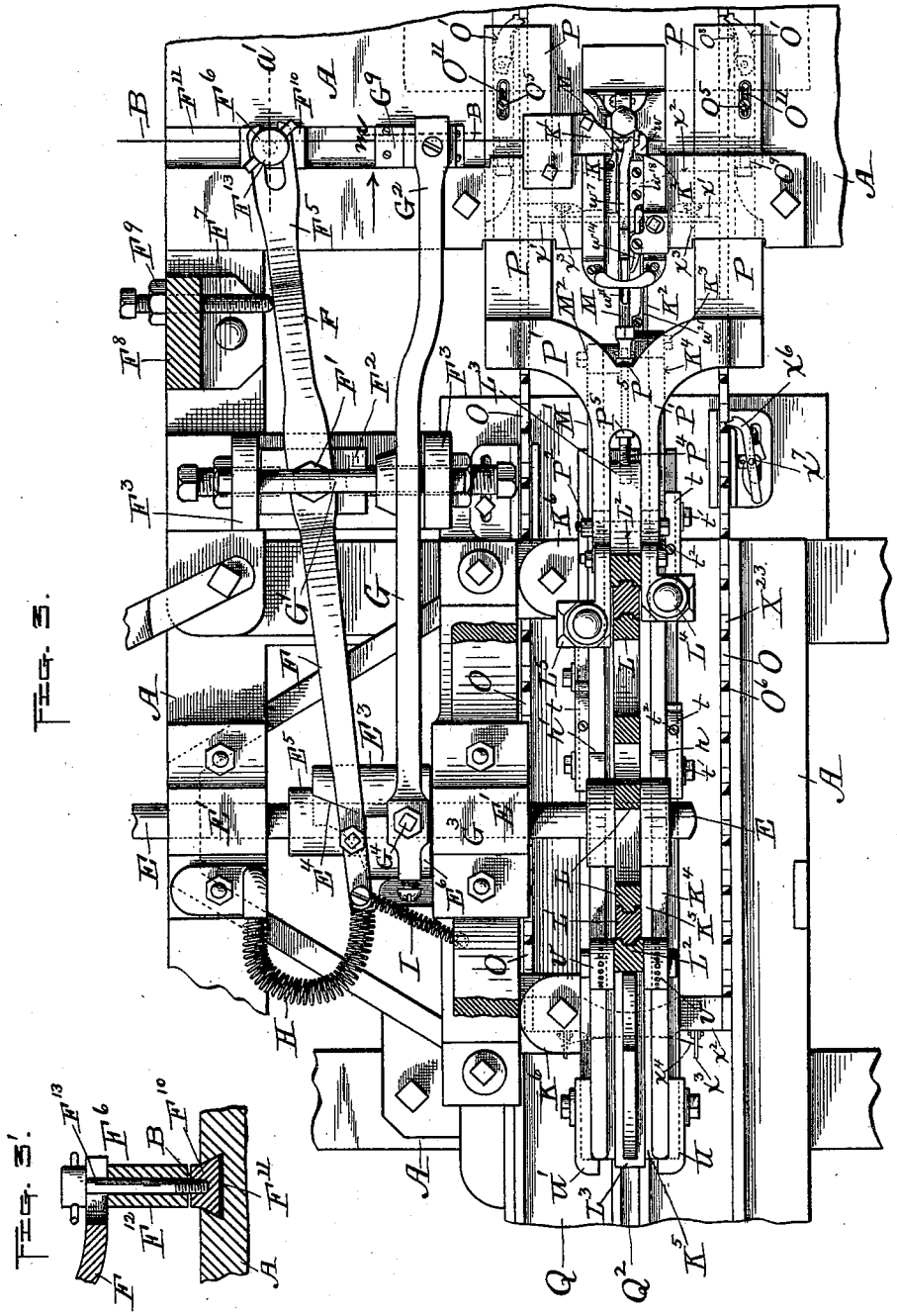
Figure 4:
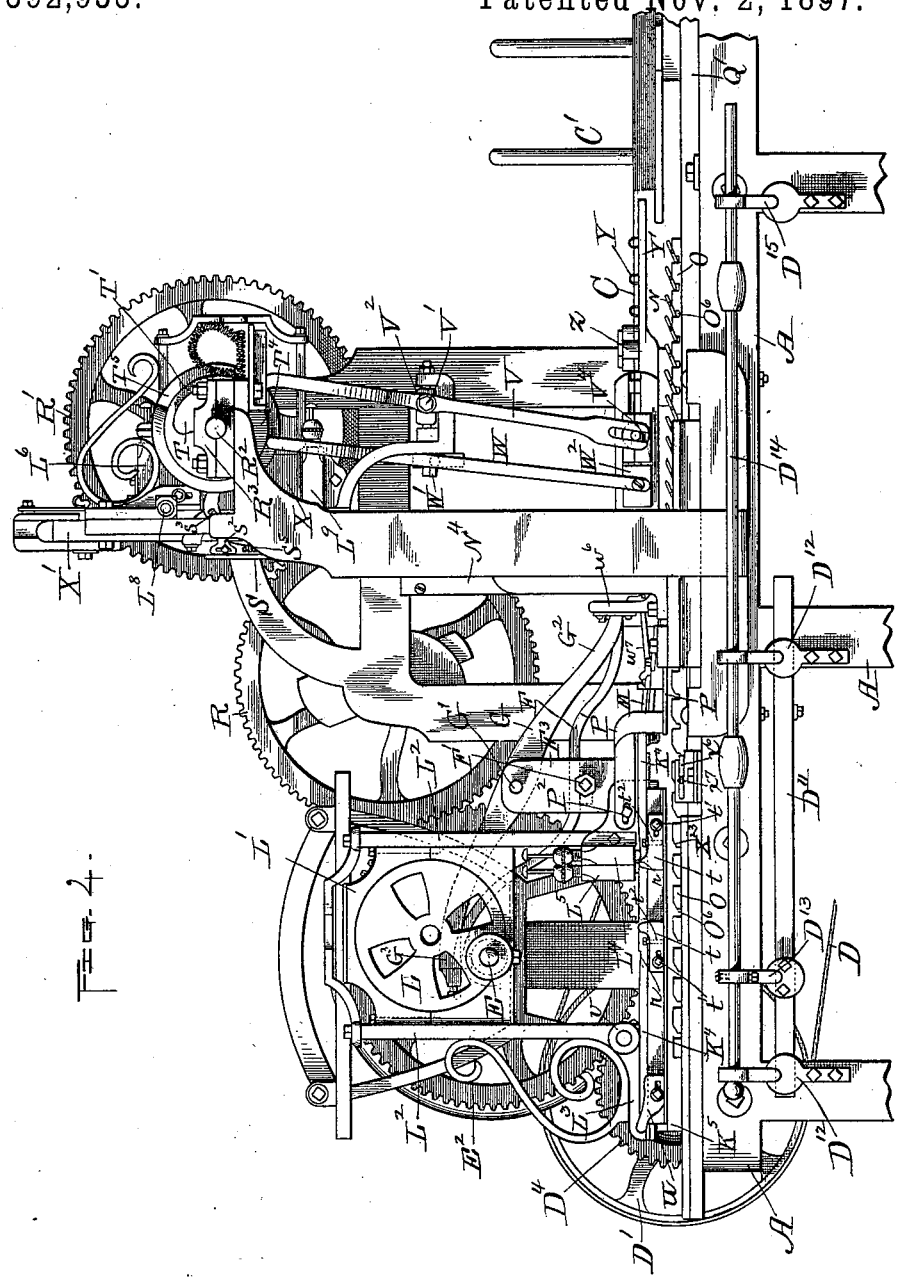
Figure 5:
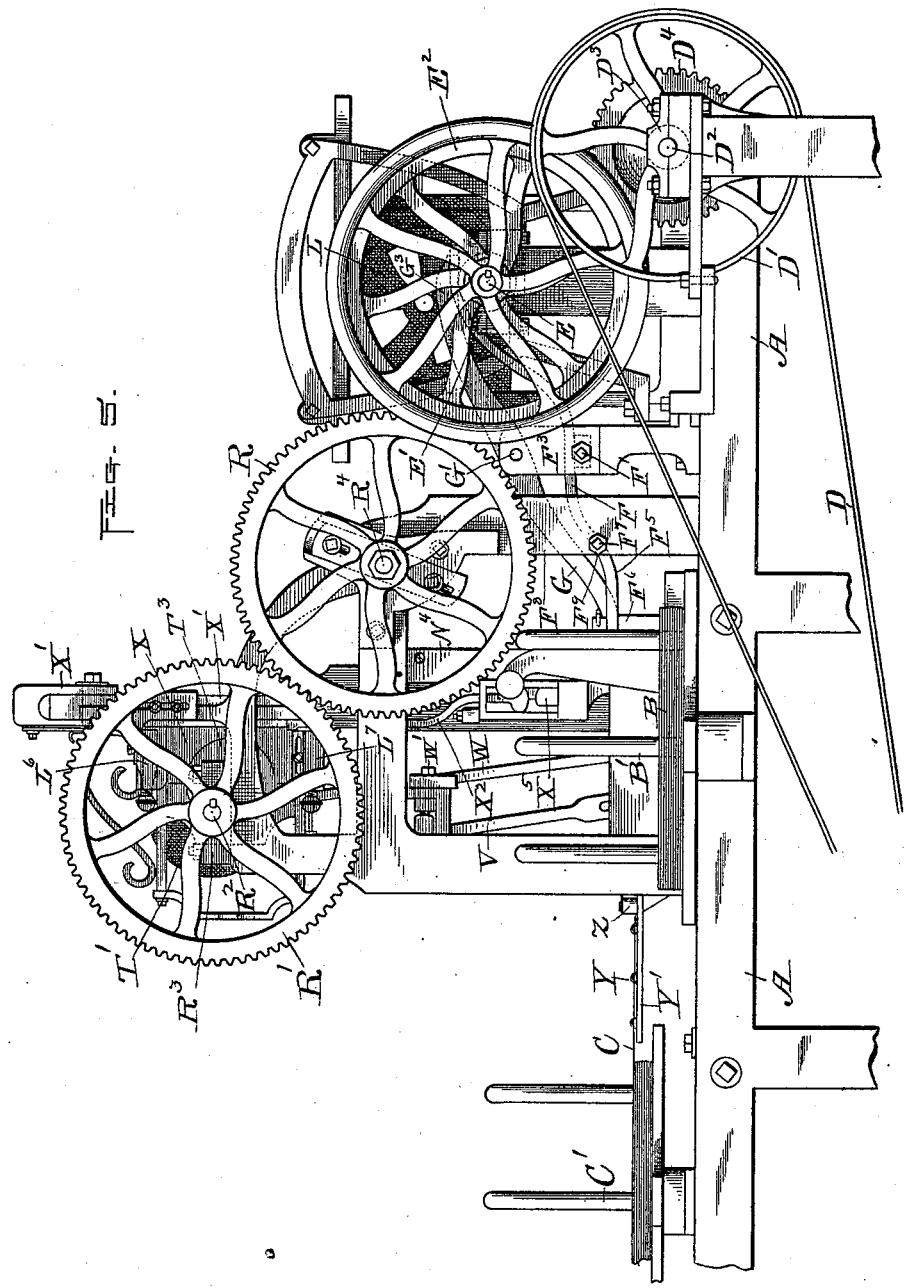
Figure 6:
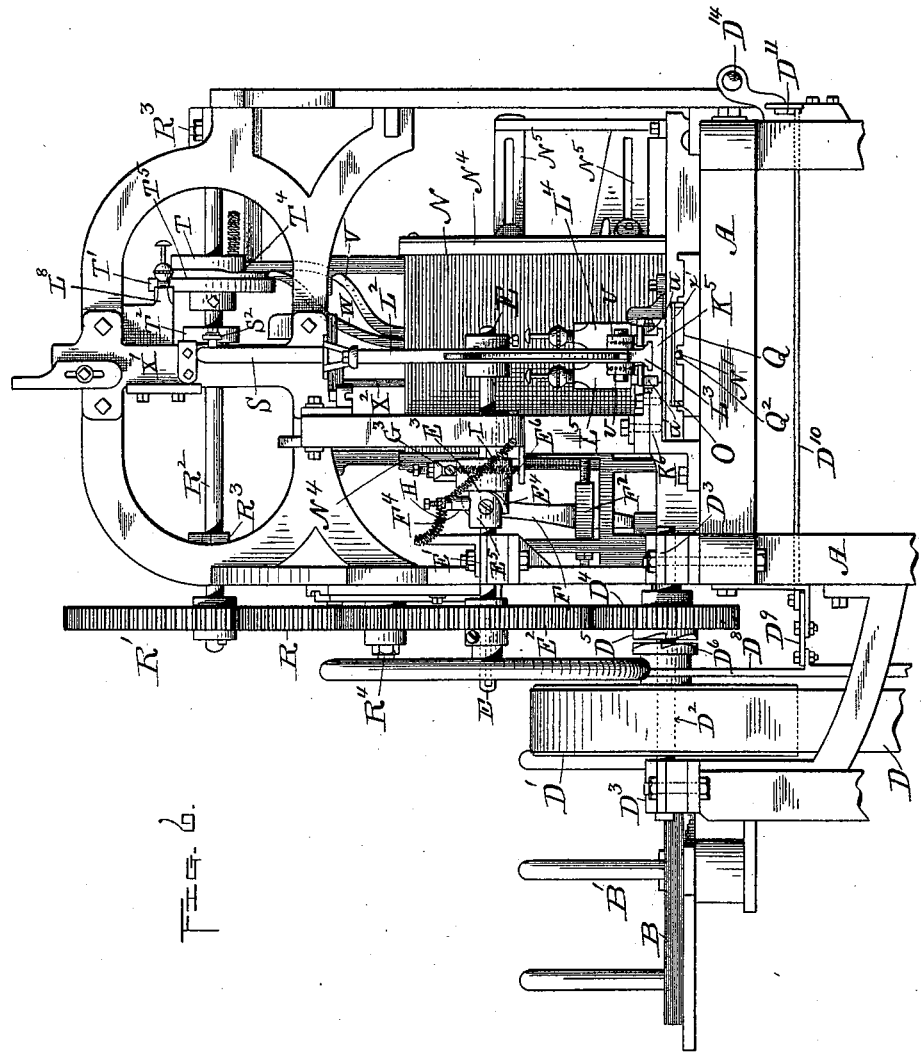
Figure 25:
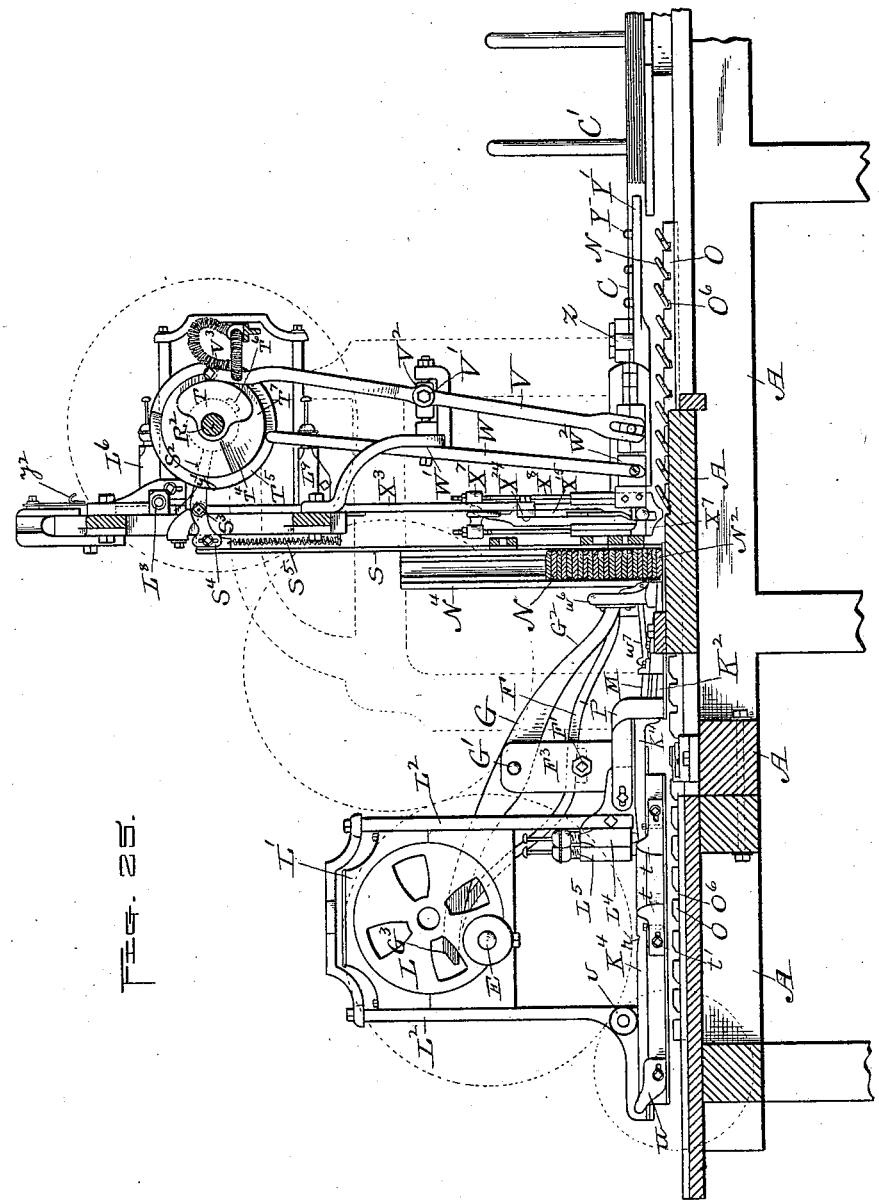

Figure 1 represents a top or plan view of a machine embodying our improvements with part of the bed or frame broken away at one end to admit of showing the operating parts upon as large a scale as possible. Fig. 2 represents, upon a smaller scale than Fig. 1, a side view of the whole machine, looking in the direction indicated by arrow $a$ in said Fig. 1. Fig. 3 represents, upon a larger scale than Fig. 1, a sectional plan of the principal central operating parts shown upon the left-hand side of said Fig. 1. Fig. 3' is a vertical section through the wire-clamp device on the end of the lever which feeds in the wire from which the slat-staples are cut and made, as hereinafter described, said section being taken on line $a'$ in Fig. 3. Fig. 4 is a front side view upon the same scale as Fig. 1 of the parts shown in said Fig. 1, looking in the direction of arrow $a$, same figure. Fig. 5 is an opposite side view from Fig. 4 of the parts shown in Fig. 1, looking in the direction of arrow $b$, same figure. Fig. 6 is a front end view of the machine, looking in the direction of arrow $c$, Fig. 1. Fig. 7 is a transverse section through the machine, taken on line $d$, Fig. 1, looking in the direction of arrow $d'$ and showing the opposite end view of said machine from Fig. 6. Fig. 8 is a vertical longitudinal section taken at the point indicated by line $e$, Fig. 7, looking in the direction of arrow $e'$, and showing a side view of the mechanism for cutting, bending, and driving the slat-bar staples, as will be hereinafter described. Fig. 9 is a vertical section on line $ff$, Fig. 8, looking in the direction of arrow $f'$, showing a side view of a portion of the parts illustrated in said Fig. 8. Fig. 10 is a horizontal section taken at the point $g$ in Fig. 8, looking down, as is indicated by the arrow. Fig. 11 is a vertical section taken at the point $h$ in Fig. 10, looking in the direction of the arrow. Fig. 12 is a horizontal section taken at the points $i$ in Figs. 8 and 11, looking down, as is indicated by the arrow. Fig. 13 is a vertical longitudinal section taken at the point indicated by line $j$ in Fig. 1, looking in the direction of the arrow, showing a side view principally of the upper part of the mechanism, hereinafter described, for feeding, cutting off and bending the wire, and for driving the slat-rod staples. Fig. 14 is a vertical longitudinal section taken at the point indicated by line $k$ in Fig. 1, looking in the direction of the arrow, showing a side view of some of the parts shown in Fig. 13, upon the opposite side from those shown in said Fig. 13. Fig. 15 is a central longitudinal section through one of the spring holding devices for holding the sliding rods or bars hereinafter described, said section being taken on line 1, Fig. 14. Fig. 16 is a vertical transverse section, taken at the point indicated by line $m$ in Fig. 3, through the staple-corrugating dies and part of the machine-bed, also showing one of the finished wire staples. Fig. 17 is a top or plan view of the mechanism for cutting and bending the slat-wire and for driving the staples into the slats, as will be hereinafter described. Fig. 18 is a vertical section taken at the point indicated by line $n$ in Fig. 17, looking in the direction of the arrow, showing a side view of some of the parts illustrated in said Fig. 17. Fig. 18' is a transverse section through part of the stationary cutter, the movable cutter, slat-driver, and other adjacent parts connected with the slat-staple cutting, bending, and driving mechanism hereinafter described. Fig. 19 is a vertical section taken on the line $o$ in Fig. 17, looking in the same direction as Fig. 18, also showing a side view of some of the parts illustrated in Fig. 17. Fig. 20 represents a top or plan view of part of the slat-wire cutting, bending, and driving mechanism, which will be hereinafter described, the slat-driving bar thereof being shown in horizontal section. Fig. 21 is a vertical section through part of the machine bed or frame, showing a side view principally of the slat-wire-feed mechanism, also hereinafter described. Fig. 22 is a plan of some of the parts shown in Fig. 21, looking down at the end indicated by line $p$. Figs. 23 and 24 are a plan and side view, respectively, of portions of the removable frames used for holding the blind-slats and slat-rods in the operation of applying the wire staples thereto by means of our improved machine; and Fig. 25 represents a vertical longitudinal section through the whole machine, partly in elevation, showing the travel of the work through the machine.

The object of our invention is to provide a machine whereby the swivel-slats of window-blinds may be pivoted to their vertical rods or bars with the utmost rapidity and precision and at the least possible expense in the manufacture of said blinds; and it consists of certain improvements and combinations of elements embodied in a power-machine for feeding two wires into the same intermittently, for cutting pieces therefrom of the proper lengths to form the staples, then bending said severed pieces to form the staples, and finally driving said staples into the edges of the slats and into the vertical slat rods or bars with each pair of staples interlocked, the slats and their rods or bars also being fed forward intermittently, all by a continuous and automatic operation, as will be hereinafter more fully set forth.

To enable others skilled in the art to which our invention appertains to better understand the nature and purpose thereof, we will now proceed to describe it more in detail.

Referring to the drawings, A represents the stationary bed or framework of the machine upon which are mounted the operating parts. Said operating parts may for convenience in describing the construction and operation of said machine be divided into the two following groups of mechanism—viz., the mechanism located principally at the left of the center of Figs. 1 and 4 for feeding in the wire and making the slat-staples, for driving said staples into the slats, for feeding forward the slat-holders and slat-rods, and for discharging the slats onto said slat-holders, and the mechanism located principally at the right of the center of said Figs. 1 and 4 for feeding in another wire and making the slat-rod staples, for driving said staples through the eyes of the slat-staples into the slat-rods, and for continuing the forward feed movement of the slat-holders with the finished slats pivoted together and laid thereon.

As will be inferred from the above description, the two main groups of mechanisms mentioned perform work of a similar nature, but the various elements which compose said mechanisms are somewhat different in construction and operation, owing to the different positions that the slat-staples must occupy in being fed to and driven into the slats from those which the slat-rod staples must occupy to be fed to and driven through the eyes of the slat-staples and into the slat-rod, as previously specified.

We will first describe the operation of feeding in the wire B from the reel B' and the construction of the mechanism embodied in the first-mentioned group of mechanism, the operation of feeding in the wire C from the reel C' and the construction of the last-mentioned group of mechanism, and, finally, the general operation of the whole machine.

Driving power is imparted to the machine from suitable mechanism (not shown) connected by a belt D with said machine. Said belt passes around a pulley D', fastened on a horizontal transverse shaft $D^2$, fitted to turn in suitable stationary bearings $D^3 D^3$. Upon said shaft $D^2$ is mounted a small loose spur-gear $D^4$, having one half of a clutch $D^5$ formed upon or secured to the side thereof, the other half $D^6$ of said clutch being fitted to turn with and also to slide longitudinally upon said shaft and adapted to engage with the part $D^5$, secured to the gear, when moved in contact therewith. Said movable part $D^6$ of the clutch may be engaged and disengaged to and from said part $D^5$ on the gear to engage or disengage the driving power to and from the machine by means of a suitable shipping device connected with said movable part $D^5$. In this instance said shipping device consists of an ordinary lever $D^8$, pivoted at its lower end, and engaging with the clutch part $D^5$ at its upper end the short pivoted lever $D^9$, the long pivoted lever $D^{10}$, the slide-bar $D^{11}$, fitted to slide in stationary bearings $D^{12}$ $D^{12}$, the connecting-bearing $D^{13}$, secured to said slide-bar and to the slide-rod $D^{14}$, and said slide-rod fitted to slide in bearings $D^{12}$ $D^{12}$ and $D^{15}$. The clutch may be engaged and disengaged by moving said slide-rod $D^{11}$ longitudinally in one direction or the other, as may be required. The driving power is transmitted from shaft $D^2$ to another horizontal transverse shaft E (located above and a little to one side of said shaft $D^2$ and fitted to turn in suitable stationary bearings E' E') by means of the large spur-gear $E^2$, which is secured upon said shaft E. Between bearings E' E' on shaft E is mounted and secured a double cam $E^3$—that is, a cam so shaped as to impart separate movements to two different levers F G.

The lever F serves, in connection with other parts, to feed in the wire B, from which the slat-staples are made, and the lever G serves, in connection with other parts, to grip said wire and hold it in position, when not being thus fed forward, during the cutting-off, bending, and driving operations hereinafter described.

The lever F is pivoted at F' to a rocking bearing $F^2$, in turn pivoted in the bearings $F^3 F^3$, thereby permitting said lever to be swung laterally as well as to be rocked vertically. It is thus operated by the double cam $E^3$, the lever being swung laterally by the side face $E^4$ of said cam acting against the vertically-pivoted friction-roll $F^4$ on said lever, (see Fig. 6,) and rocked vertically by the bottom end of said roll passing over the peripheral portion $E^5$ of said cam as the latter is rotated.

The inner end $F^5$ of the lever F is provided with a suitable grip device $F^6$, through which the wire B passes and is gripped to draw it forward into the machine. The cam $E^3$ forces down said end $F^5$ of the lever to grip the wire by the peripheral portion $E^5$ (see Fig. 6) forcing up its opposite end, just prior to the operation of swinging in said end $F^5$, by the side face $E^4$ (see Figs. 1, 3, and 6) acting on the friction-roll $F^4$ to draw the wire forward, and said depression of the end $F^5$ is released just prior to the back swinging movement thereof. The lever may be thus swung back after releasing the wire to return for the next feed movement by means of suitable springs connecting the same with some stationary part of the machine, in this instance the springs H I being employed for said purpose. The swinging movement imparted to the lever may be controlled by an adjustable stop-screw $F^7$, fitted to turn in a stationary bearing $F^8$ and provided with a lock-nut $F^9$.

The grip device $F^6$ consists of a bottom slide-block $F^{10}$, fitted to slide in a transverse guideway $F^{11}$ in bed A, a block $F^{12}$, between which and said slide-block the wire passes, and a vertical bolt $F^{13}$ passing down through the end of the lever F, said block $F^{12}$ and slide-block $F^{10}$ being fastened in said slide-block and the lever and plate fitted loosely thereon. By this construction it is obvious that when the lever is pressed down on the block $F^{12}$ the wire H is clamped between the same and the slide-block, and vice versa when said pressure is released.

Between the grip device $F^6$ and the reel or spool $B'$, upon which the wire B is wound, are preferably arranged a series of friction straightening-rolls J, for straightening the wire prior to being fed into the center of the machine to be cut and bent into staples. We do not limit ourselves to their use, however, as they are not essential to the proper carrying out of our invention.

The lever G, which grips and holds the wire B while the latter is not being fed forward, as previously stated, is pivoted to a transverse horizontal shaft $G'$, mounted in the bearings $F^3 F^3$. Its inner end $G^2$ is depressed to thus grip the wire by the action of the peripheral portion $E^6$ of cam $E^3$ acting on the outer end $G^3$ of said lever, said end being preferably provided with a vertical screw $G^4$, whose inner end bears upon the cam and which may be adjusted by turning it in the end of the lever to vary the pressure, as may be required.

In Fig. 16 we have shown a vertical transverse section through the lower part of the end $G^2$ of lever G and the wire-gripping device, which in this instance consists of a plate $G^5$ on the bottom of the lever and the plate $G^6$, between which the wire B passes. The wire is guided as it enters between said plates by a plate $G^7$, having a hole therein through which said wire passes. The bottom plate $G^6$ is fastened to a slide-block $G^8$, fitted in the inner end of the guideway $F^{11}$, by a top plate $G^9$, laid transversely over the wire and plate $G^7$, and the vertical screws $G^{10}$, passing down through said plates $G^9 G^6$ and into block $G^8$. In said Fig. 16 the plates $G^5 G^6$ are represented as being provided upon their bottom and top surfaces, respectively, with transverse teeth $G^{11}$, between which the wire passes and is corrugated by the pressure of lever G, as is indicated on the staple in said Fig. 16. Said teeth may be employed or not, as desired.

The wire is fed forward intermittently by a lever F, as previously described, the proper length to form each staple, and each piece of wire is successively severed from the forward or inner end of the wire strand, after each of said intermittent feed movements, by suitable beveled cutters K $K'$, (see Figs. 17, 18, 18', and 20,) the cutter K being movable and the cutter $K'$ stationary. The movable cutter consists of a plate whose front is cut upon a bevel, as is shown at $q$ in Figs. 17, 18, 18', and 20, and which is fastened to the longitudinal slide-plate $K^2$, in turn secured at $K^3$ to the slide-bar $K^4$, fitted to slide longitudinally in a suitable guideway in frame $K^5$, fastened on one side to supporting-brackets $K^6 K^6$, secured to bed or frame A.

The piece of wire which forms the staple is cut from the main strand at an angle to form the pointed ends by the beveled surface $q$ of the movable cutter being passed forward in contact, or nearly so, with the beveled surface $q'$ of the stationary cutter, the block forming said stationary cutter being provided with an opening $q^2$, (see Figs. 18 and 18',) through which the wire is fed in transversely to the movable cutter.

The slide-bar $K^4$ and parts attached thereto are moved longitudinally by the shaft E through the eccentric L, (see Fig. 4,) secured to said shaft, the vertical plate $L'$, in which it turns, fitted to slide vertically in the standards $L^2 L^2$, whose lower ends are formed upon or secured to a sliding frame or carriage $L^3$, fitted to slide longitudinally in frame $K^5$, and the catch device $L^4$, mounted on said carriage, which is adapted to engage with notches $r$ $r$ in the slide-bar $K^4$ to move the latter longitudinally in toward the center of the machine to carry forward the cutter K, and the staple pusher or driver M, hereinafter described. Said catch device is constructed substantially like the catch device $L^7$, (shown in Fig. 15,) and a detailed description thereof will cover this and the other similar devices used for the same purpose, hereinafter referred to. It consists in this instance of the casing $s$, having the hollow screw-head $s'$, fitted in one end, the catch $s^2$, fitted in said casing at the opposite end from head $s'$, and the spiral spring $s^3$, also fitted in said casing between said head and catch. The outer end of the catch is provided with a square part $s^4$, over which the slide-bar $K^4$ comes, so as to catch against the notches $r$ in the latter when permitted to do so in operation, and also with the rounded part $s^5$, coming outside of said slide-bar and adapted to engage with fixed adjustable lifting-fingers $t\ t$, against the upper ends of which said rounded ends impinge when the carriage $L^3$ and parts attached thereto are moved forward and back longitudinally past said fixed lifting-fingers, thereby raising the catch $s^2$, so that its square part will pass over and not engage with the notches $r\ r$ in the slide-bar $K^4$. The catch device is also provided with a central rod $s^6$, which passes longitudinally through the screw-head $s'$ and spring $s^3$ and is fastened in the catch $s^2$ for the purpose of disengaging the catch from the notches $r$ by hand, when desired, its upper end being provided with the head $s^7$ to facilitate said operation.

Five other catch devices $L^5$, $L^6$, $L^7$, $L^8$, and $L^9$, made substantially like the one above described, are used on the machine at different points for a like purpose to act in conjunction with other mechanisms hereinafter described. Being of like internal construction, a detail description thereof will be unnecessary when referring to the same later on in the description. The devices $L^4\ L^5$ are arranged vertically and the others horizontally, the illustration shown in Fig. 15 being of one of said horizontal ones, $L^7$, as previously stated.

The slide-bar $K^4$, being operated forward and back longitudinally by engagement with the reciprocating catch device $L^4$, as above described, is liable to be occasionally pushed back too far by the sudden impact of the catch against one of the notches $r$, and we therefore prefer to use a stop $u$ on the outer end of frame $K^5$ for controlling said outward movements, but do not limit ourselves thereto.

The catch-lifters $t\ t$ are each adjustably fastened to frame $K^5$ by means of a screw $t'$, passed through one end thereof into said frame. Their other ends may also each be adjusted vertically by means of the adjusting-screw $t^2$ by turning the latter up or down therein.

Friction-rolls $v\ v$, one at each side of the foot of the outer standards $L^2$ and traveling on the slide-bar $K^4$, are preferably employed for reducing the friction of the bottom of carriage $L^3$ on the bottom of the guideway in which it travels, but we do not limit ourselves to the use thereof.

The operation of cutting off the pieces of wire from which the staples are made, as hereinbefore described, also causes said wire to be bent into the form of said staples in the following manner: The forward end of the slide-plate $K^2$ is made fork-shaped, being provided with the two arms $w\ w'$, (see Figs. 18' and 20,) between which the staple pusher or driver M is arranged, the latter being fitted to move longitudinally in guideways $w^2\ w^2$ in said arms $w\ w'$, as is best shown in Fig. 18'. The forward ends of the arms $w\ w'$ are made beveling or V-shaped toward each other in plan view, as is shown in Figs. 17 and 20, and therefore when the plate $K^2$ is moved forward to cut off the piece of wire from the strand, as aforesaid, after said piece of wire has been severed, the beveled sides $w^3\ w^3$, coming against the ends of the severed piece, bend the same forward around the vertical bar $w^4$, which is held stationary during said bending operation. When thus bent, the staple occupies a horizontal longitudinal position pointed toward the pile of slats N, hereinafter described, and is in proper position to be driven into the edge of the bottom slat in said pile, which lies upon the raised portion A' of bed or frame A. (See Figs. 6, 8, and 18.)

The staple pusher or driver M and its guideways are made upon a downward incline toward the edge of the bottom slat $N^2$, as is shown in said Fig. 18, so that the staples $N^3$ may be driven into the slats at the usual required angle to permit said slats to lie flat, one against another, after being fastened to the central holding slat-rod N' of the blinds, as will be hereinafter described.

The staple pusher or driver M is operated from the eccentric L in a similar manner to the operation of the cutting and bending devices hereinbefore described through the slide-bar M', to which said pusher or driver is secured at $M^2$, and the catch device $L^5$, previously described, mounted on said slide-bar M' and adapted to engage with the notches $r'\ r'$, formed in said slide-bar. The latter may be controlled in its back movements by a stop $u'$, similar to stop M, for controlling the back movements of the slide-bar $K^4$.

The catch devices and notches in the slide-bars are so disposed in relation to each other in practice as to cause the slide-bar $K^4$, connected with the wire cutter and bender, to be moved forward just in advance of the slide-bar M', connected with the staple pusher or driver previously described. The two devices being both mounted on the same reciprocating support are moved back and forth together by the eccentric L, but are not arranged in alinement with each other transversely, the catch device $L^4$ being arranged a little in advance of the catch device $L^5$, so as to engage with one of the notches $r$ on the slide-bar $K^4$ and move it forward in advance of the slide-bar M', as and for the purpose above described.

The vertical bar $w^4$, previously alluded to, against which the center of the short pieces of wire (cut from the strand) are pressed by the beveled sides $w^3\ w^3$ to bend the same into loop forms to produce the staples, is moved down longitudinally, so that its bottom end will come below the opening $q^2$, through which the wire passes just prior to the bending operation and is elevated again out of the way immediately after the staple is formed. It is depressed or forced down by a spiral spring $w^5$, adapted to exert a downward pressure thereon, (said vertical bar and spring being arranged in a suitable stationary bearing $w^6$,) and is elevated by a raising or swinging lever $w^7$, upon which a stud or shoulder $w^9$ on the vertical bar rests, as is shown in Figs. 18 and 19. Said lever $w^7$ is pivoted at its forward or inner end forward of the vertical bar $w^4$ to a stationary bearing $w^8$, and its opposite end is elevated to raise said bar, as aforesaid, by the raised beveled portion $M^3$ of the staple pusher or driver M coming in contact with and passing under said end, which travels up over said beveled end onto the level raised part of said staple pusher or driver. The lever and its vertical bar are held thus elevated during the operations of cutting off the short piece of wire from the strand, of bending said piece of wire into the form of the staple, and of driving said staple into the slat, the rounded end $w^{10}$ of the lever passing along the longitudinal guide-groove $w^{11}$ in the top of the pusher or driver M as the latter is moved forward to drive said staple, which passes forward through an opening $w^{12}$ in the stationary guide $w^{13}$, arranged between the vertical bar $w^4$ and the pile of slats N, said guide-opening being upon a downward incline toward the edge of the bottom slat $N^2$ for the purpose previously specified.

The pusher or driver M is locked against being moved forward longitudinally by the friction of the catch device $L^5$ on the surface of the slide-bar M', except when the proper time arrives for it to be moved forward to drive the staples, as aforesaid, by a lock-lever $w^{14}$, pivoted at $w^{15}$ to a stationary bearing and which engages with a notch $w^{16}$ in the pusher or driver M, being thus locked and kept locked by the end $w^{17}$ of the fixed finger $w^{18}$ on slide-plate $K^2$, bearing on the inner side of the end $w^{19}$ of the lever $w^{14}$ until said slide-plate moves the fixed finger $w^{18}$ beyond the end $w^{19}$ of lever $w^{14}$, when said lever $w^{14}$ is disengaged from the notch $w^{16}$ by the end $w^{20}$ of the fixed finger $w^{21}$ on the slide-plate $K^2$ coming into contact with the outer side of said end $w^{19}$, and thereby forcing the lever $w^{14}$ out of engagement with its notch and permitting the slat-driver M to be moved forward, said operation of unlocking the lever by the forward movement of the slide-plate $K^2$ being of course performed just prior to the engagement of the catch device $L^5$ with the notch on the slide-bar M' and movement of the latter forward. Although it is preferable in practice to employ said lock device for the above-described purpose, the same not being an essential feature, we reserve the right to use same or not, as desired.

The slats are piled one over another between suitable end guide-frames $N^4 N^4$, which hold said pile of slats in their proper position and also permit them to drop down as each bottom slat $N^2$ is moved forward from under the same, as hereinbefore described. As the pile decreases the attendant supplies new slats at the top in sufficient quantities to maintain a continuous discharge at the bottom. The end guide-frames $N^4 N^4$ are adjustably fastened to the horizontal slotted transverse frames $N^5 N^5$ by means of set-screws $N^6$, (see Fig. 7,) and may therefore be adjusted laterally to conform to different lengths of slats. The staple having been driven into the bottom slat the latter is pushed forward from under the pile of slats N and off of the raised platform A' onto the slat supporting and conveying frame O by the front ends of the pusher-plates P P, which plates are arranged parallel to each other and formed upon or secured to the forked frame P', in turn adjustably secured at $P^2$ to the longitudinally-reciprocating frame or carriage $L^2 L^3$, previously described, being adapted to be adjusted longitudinally by means of a suitable adjusting screw $P^4$ turning in said forked frame P' and carriage $L^3$ and having set-nuts $P^5 P^5$, as is shown in Fig. 3. The forward ends of said pusher-plates are arranged to come against the edge of the bottom slat $N^2$ to push it forward, as aforesaid, just after the staple has been driven into the same, and the slat supporting and conveying frame O is likewise moved forward simultaneous with the pusher-plates the distance between one slat and the next one deposited thereon by a spring-pawl O', arranged under each pusher-plate and each pivoted at $O^2$ to slide-blocks $O^3$, fitted to slide longitudinally in guideways $O^4$ in frame A and adjustably secured at $O^5$ to said pusher-plates P P. The forward ends of said pawls are adapted to engage with transverse notches $O^6$ in the side pieces of conveyer O, and each is kept in engagement therewith by a spring $O^7$, except when forcibly pushed or disengaged therefrom by their inner sides coming against the stationary cam-surfaces $O^8$ of frame A, when the pawls and their blocks are moved back by the return movement of the pusher-plates.

The slide-blocks $O^3$ may each be adjusted longitudinally by means of an adjusting-screw $O^9$, fitted to turn in a bearing $O^{10}$ on the under side of the pusher-plates and in the end of said slide-block, the pusher-plates being each provided with a slot $O^{11}$, wherein the screws $O^5$ fit that fasten the slide-blocks and pusher-plates together.

The bottom slats $N^2$ are held against the pressure of the pusher or driver M in the operation of driving the staples into the same, as hereinbefore described, by means of a vertical bar S, arranged to be moved down to thus hold the bottom slat, as is shown in Fig. 18, and elevated out of the way, so that said slat may be pushed forward, as shown in Fig. 8, by mechanism hereinafter described. Said bar slides up and down in suitable guideways in cross-frames $N^5$ and also serves to hold the pile of slats laterally upon the inner side thereof.

The frames O for supporting and conveying the slats and slat-rods forward in the operation of pivoting said parts together are made in sections, and each section is adapted to be detachably fastened to the ones at each end thereof to form a continuous slat support and conveyer or carriage extending nearly or quite the full length of the machine. Each section is preferably made the proper length to receive one set of slats after being fastened to the rod, and in practice as fast as each set of slats is fastened to its respective rod each successive front frame with its completed set upon it is removed by the attendant and a new empty frame inserted at the opposite end of the machine, as is indicated in Fig. 6 of the drawings.

The slat-frames are kept in their proper positions in passing longitudinally through the machine, as aforesaid, by means of suitable guideways Q and rods or bars Q', the slat-rod N' being kept in its proper position in passing into the machine by lying in the longitudinal groove $Q^2$. (See Figs. 1 and 3.)

The construction of the slat conveyer or carriage O is as follows, (see Figs. 23 and 24:) In Fig. 23 we have shown a plan of one of the sections composing our said continuous slat conveyer or carriage with part of the central portion broken away and the forward end of the next succeeding section attached thereto, while in Fig. 24 is shown upon a larger scale a side view of the abutting ends of two sections fastened together. Each section consists of the side frames $x$ $x$, which are arranged parallel to each other and are connected together by the cross-rod $x'$ and frame $x^2$. The cross-frame $x^2$ is provided with two pivoted hooks $x^3$ $x^3$, adapted to fit over the cross-rod of the next succeeding section, and a downward yielding pressure is imparted thereto to hold them in engagement with the rod and also permit them to be disengaged therefrom by means of suitable springs $x^4$ $x^4$, fastened to the cross-plate at one end and engaging with the hooks at their other ends. Any other similar device may of course be used for the same purpose in lieu thereof, if desired. The above devices are preferable, however, in practice, as the attendant has simply to hold the section with the hooks over the cross-rod and spring the hooks down over same into place.

The slat-rods N' are placed in the carriage-sections O when said carriage-sections are placed in the machine, one end being held by forcing the same against the barbs or spurs $x^5$ on cross-frame $x^2$ and the other end lying in the longitudinal groove $Q^2$, previously referred to. Said longitudinal groove extends to where the staples are driven into said slat-rods, from there forward the rods of course being suspended by said staples from the slats.

The slat-conveyer O may be controlled in its longitudinal movements when operated as hereinbefore described by a spring-pawl $x^6$, pivoted at $x^7$ to a stationary bearing and adapted to engage with said conveyer, as is shown in Figs. 3 and 4.

Having described in detail the mechanism for feeding in one wire B, cutting off and making the staples therefrom, driving said staples into the slats, and for feeding the slats forward, we will now describe the mechanism relative to the other wire C, whereby the staples are cut, made, and driven through the eye of the slat-staples and into the slat-rod to pivot said slats to the rod.

Driving power is transmitted from the large gear $E^2$, previously described, to operate said mechanism through the large gears R R', intermeshing one with another, and the horizontal transverse shaft $R^2$, fitted to turn in suitable stationary bearings $R^3$ $R^3$, the intermediate gear R being fitted to turn on an adjustable stationary stud $R^4$ and the gear R secured to one end of said shaft $R^2$. Upon shaft $R^2$ are secured the cams T, T', and $T^2$. The cam T operates the mechanism for feeding the wire C into the machine, cam T' for operating the mechanism for clamping and holding said wire while the short pieces are cut therefrom to form the staples and while said pieces are being bent into the shape of the staples and the latter driven into the slat-rods, and the cam $T^2$ operates through suitable mechanism the vertical slat-holding bar S, previously described. Upon shaft $R^2$ is also secured the eccentric $T^3$ (see Fig. 14) for operating the mechanism for cutting off, bending, and driving the staples into the slat-rods. The mechanism operated by cam T consists of the lever V, pivoted at V' to a stationary trunnion-bearing $V^2$ and having a friction-roll $V^3$ at its upper end adapted to travel over the periphery of said cam to impart the action of the latter to said lever. The lower end of the lever engages with a clamp device $V^4$, similar in its action upon the wire to the device shown in Fig. 3', previously described. Sufficient lateral pressure is imparted from the lever V to said clamp to hold the wire in feeding it forward, as aforesaid, by the upper end of said lever engaging with the side face $T^4$ of cam T', which is made sufficiently irregular in shape to impart the required lateral motion to said lever V, the trunnion-bearing to which the lever is pivoted, as above stated, permitting of said lateral motion.

In addition to the lateral cam-surface $T^4$ cam T' is made with the lateral cam-surface $T^5$, outside of said cam-surface $T^4$ and next to the periphery of the cam. The upper end of the lever W, pivoted at W' to the same stationary bearing as lever V, engages with said cam-surface $T^5$, and is thereby rocked laterally on its pivot W', thus forcing the wire-clamping block $W^2$ on the lower end of the lever toward or from the wire to hold or release the same, as required in the operation of the machine. The vertical slat-holding bar S is elevated by the cam $T^2$ through the rock-lever $S^2$, pivoted at $S^3$ to a stationary bearing, the outer end $S^4$ of said lever being adjustably pivoted to the upper end of the vertical bar S and its inner end adapted to engage with the lug or projection $T^6$ on cam $T^2$, (see Figs. 1, 7, and 13,) which engages with the inner end of rock-lever $S^2$, when said cam $T^2$ rotates, and thus elevates the bar S, as aforesaid. After the cam projection passes by the end of the lever and said lever is released the bar S drops down by force of gravity and by the action of the spring $S^5$, adapted to draw downward on said bar, as is also shown in Fig. 13. The lug or projection $T^6$ is adapted to lift and release the bar S in unison with the intermittent forward feed movement of the slats, previously described.

The cutting-off, bending, and driving mechanism operated by the eccentric $T^3$, previously referred to, is constructed and operates as follows: Said eccentric is secured to and turns with shaft $R^2$ and is fitted to turn in a frame X, fitted to slide up and down with continuous reciprocating movements in a suitable stationary frame $X'$. The catch devices $L^6$, $L^7$, $L^8$, and $L^9$, previously described, are adjustably mounted upon said vertically-reciprocating frame X, the devices $L^6$ $L^7$ being adapted to engage with notches $y$ in the vertical connecting slide-bar $X^2$ and the devices $L^8$ $L^9$ with notches $y'$ in the vertical connecting slide-bar $X^3$. (See Fig. 7.) The vertical connecting slide-bar $X^2$ engages with and operates the cutting-off and bending mechanism, and the vertical connecting slide-bar $X^3$ is connected with and operates the staple pusher or driver, which drives the finished staples into the slat-rod. The connecting slide-bar $X^2$ has pivoted to its lower end at $X^4$ the upper end of a slide-bar $X^5$, fitted to slide in a suitable guideway $X^6$ in a vertical slide-frame $X^7$, consisting of bottom and top cross-pieces connected by vertical rods $X^8$ $X^8$, as is shown in Figs. 8 and 10. Said vertical frame is in turn fitted to slide up and down in a stationary frame $X^9$.

Upon the lower end of the vertical slide-bar $X^5$ is secured the cutter $X^{10}$, made beveling and adapted to act in conjunction with the beveled stationary cutter $X^{11}$ (see Figs. 8, 9, 11, and 12) to cut the wire off upon an angle to point the same, as in the previously-described case relating to wire B, said stationary cutter being provided with a horizontal opening $X^{12}$ for the wire C to pass through. The slide-bar $X^5$ is provided with the bevels $X^{13}$ $X^{13}$ at the lower end (corresponding to the bevels $w^3$ $w^3$) for bending the severed piece of wire over the horizontal bar or former $X^{14}$ (corresponding to the vertical bar $w^4$) to form the staple. To the lower end of the vertical slide-bar $X^3$ is pivoted another vertical bar or connection $X^{15}$, having the staple pusher or driver $X^{16}$ secured to its lower end. Said pusher or driver slides up and down in a slot or groove $X^{17}$, formed in the slide-plate $X^5$, and the face of its upper end is provided with a vertical groove $X^{18}$, in which the outer end of the swinging arm $X^{19}$ lies, as is shown in Figs. 9 and 10, the purpose thereof being to force the horizontal bar or staple-former $X^{14}$ back longitudinally out of the way after the staple is formed and prior to its being driven into the slat-rod, as hereinafter described, said horizontal bar $X^{14}$ being provided with a transverse stud $X^{20}$, against which the outer edge of the arm $X^{19}$ impinges to force back said bar $X^{14}$, as aforesaid, when the staple-driver $X^{16}$ descends to drive the staple and causes the outer end of the arm $X^{19}$ to travel up over the curved or inclined surface of the groove $X^{18}$, as is shown in Fig. 9. After the staple is driven the driver again ascends preparatory to driving the next staple, and in moving up the arm $X^{19}$ is permitted to move in toward the driver, thereby permitting the horizontal bar to also move in the same direction into position for the next staple to be bent over the same. The forward movement of said horizontal bar is made positive by means of a spring $X^{21}$, fitted in a suitable bearing $X^{22}$ and adapted to exert a constant longitudinal pressure thereon to force it forward when the lever $X^{19}$ is permitted to swing in, as aforesaid.

After each bottom slat $N^2$ is pushed forward, as previously described, it lies flat or practically so upon the conveyer or carriage O with its back edge a trifle in advance of the vertical slat-driver and its staple (which has previously been driven therein, as was also hereinbefore described) in proper position for one prong of the staple to be driven through the loop or eye of said staple in the slat, as is shown in Fig. 8, but when the driver descends and drives said staple the slat is tipped upon an incline by said operation and lies on the inclined surfaces $X^{23}$ of the conveyer or carriage O, where it and those previously pivoted to the slat-rod $N'$ are held, as is indicated in Figs. 4 and 8.

Just prior to pushing forward each bottom slat, as aforesaid, the vertical slide-frame $X^7$, in which the vertical slide-bar $X^5$ moves up and down, is forced up so that its bottom end will be lifted out of the way of the slats, being thus pushed forward by the upper end $X^{24}$ of the vertical connecting-bar $X^5$ coming against the bearing $X^{25}$ on the upper cross-piece of said slide-frame $X^7$, when the connecting slide-bar $X^3$ and its staple-driver ascend after driving each staple, and when said parts again descend to drive the next staple the upward pressure on said frame $X^7$ being removed the latter descends by force of gravity into its lowest position, as shown in Fig. 8.

The slide-bar $X^2$, through which connection is made with the cutter and bender acting on wire C, is lifted and held suspended during the interval occupied in pushing the bottom slat forward, as aforesaid, and released and pushed down after said operation in the following manner: The slide-bar is forced up by the action of eccentric $T^3$ through frame X and the bottom spring-catch $L^7$, mounted thereon, said spring-catch $L^7$ engaging with one of the notches $y$ on said slide-bar and thus carrying the latter up with the frame X when the latter ascends. Upon the slide-bar arriving at its highest elevation a notch $y^2$ in its upper end engages with a stationary spring hook or catch $y^3$, (see Fig. 14,) and thereby holds said slide-bar suspended until the continued upward movement of the frame X causes a projection $y^4$ on top of the spring-catch $L^6$ to engage with the projecting finger $y^5$ of spring hook or catch $y^3$, when the latter is then disengaged from the notch $y^2$ in the slide-bar and said slide-bar is released. In the meantime the top catch device $L^6$ has passed above the top notch $y$ in the slide-bar, and immediately upon the release of said slide-bar the motion of frame X is reversed, and, now descending, carries the slide-bar down with it, with the catch device $L^6$ against said top notch $y$. In Fig. 14 the slide-bar is shown in its lowest position and the frame X in the act of descending to bring its bottom spring-catch $L^7$ in engagement with the notches $y$ in said slide-bar shown just below said spring-catch in said Fig. 14 preparatory to lifting the slide-bar up to engage it with its hook $y^3$ at the top, as previously described.

The wire C may be properly guided from its reel C' into the machine by suitable guide-loops Y, fastened in a stationary frame Y', and said wire may also be properly straightened before entering the operating parts of said machine by passing between suitable friction-rolls Z, similar to the rolls J employed for straightening the wire B.

Having described the machine in detail, the operation thereof may be briefly summed up as follows: The wire B is first fed forward into the machine by the operation of lever F and its cam and gripper. The lever G and its cam and gripper or clamp then grip and hold the wire after having been thus fed forward, and the lever F and its gripper are swung back by their operating-cam preparatory to the next feed movement. The slide-bar $K^1$ and the parts attached thereto now moving forward causes the piece of wire from which the staple is to be made to be severed from the main strand, and immediately following said cutting operation the two bevels $w^3$ $w^3$ on the slide-plate $K^2$ come into play and, pressing forward against said severed piece of wire, bend it around the vertical bar or staple-former $w^4$ into the shape of a loop, constituting the staple, having sharpened ends by severing the wire upon an angle, as previously described. The vertical bar or staple-former is now elevated out of the way and the pusher or driver M moves forward and drives the finished staple into the edge of the bottom slat $N^2$ of the pile of slats N, the guideway for said driver and for the passage of the staple to said slat being upon an angle, as and for the purpose previously described. While the staple is being driven into the bottom slat, as aforesaid, the latter is held against the pressure of the driver in said operation by the vertical bar S. The latter is now moved up out of the way and the pushers P P are moved forward and push the conveyer O and the bottom slat (with the staple driven into the slat) forward to bring said slat under the mechanism which cuts, bends, and drives the other staple through the loop of the first staple into the slat-rod N' and to move the slats already pivoted to the rod forward out of the way of said slat last deposited on the conveyer. The wire C having been fed forward by the lever V, its cam and gripper, and cut off and bent to form the second staple by the operation of the vertical connecting-bar $X^2$ and its attachments, said second staple is now driven vertically through the eye or loop of the staple already driven horizontally into the slat, as aforesaid, and into the slat-rod, as is shown in Fig. 8, by the operation of the vertical connecting-bars $X^3$ $X^{15}$ and the slat-driver $X^{16}$, mounted on the lower end of said bar $X^{15}$. The driver and the vertical slide-frame $X^7$ are then moved up out of the way for the next bottom slat (which has had a staple driven into it during the operation of driving the second staple, as aforesaid) to be pushed forward when the aforesaid operations are continuously repeated and a continuous series of slats pivoted to the slat-rod, equidistant apart, at an angle and parallel to each other, as is shown in the drawings. After each slat-rod has been filled the section of the conveyer O, to which it is attached, with the pivoted slats and rod upon it, is removed by the attendant from the front end of the machine and the slats and rod then removed from said conveyer-section. An empty conveyer-section is next placed in position at the rear of the machine and attached to the next preceding conveyer, as previously described, in the meantime the pile of slats N being also replenished by the attendant to maintain a continuous operation of attaching one slat after another to the slat-rods.

From the foregoing description it is obvious that the whole operation of attaching the slats to the slat-rods, with the exception of supplying the empty conveyor-sections, removing said sections after each slat-rod is filled, and of replenishing the supply of slats in pile N, as aforesaid, is performed automatically, thereby effecting a large saving in the cost of manufacturing blinds over the usual method of attaching slats to the slat-rods. Then, again, by thus attaching said slats by an automatic mechanical operation or process each slat occupies the same relative position to another, and the utmost precision and uniformity are maintained throughout the series of slats. Consequently blinds supplied with slats thus attached to their rods may be operated very easily and are of a superior grade and quality.

Having described our invention, what we claim therein as new, and desire to secure by Letters Patent, is—

1. The wire-grip device $F^6$, consisting of the slide-block $F^{10}$, fitted to slide in bed A; the vertical bolt, $F^{13}$, passing through the end of pivoted lever F and fastened to slide-block $F^{10}$, and block $F^{12}$, fitted over said bolt between lever F and slide-block $F^{10}$, in combination with bed A, pivoted lever F and means for operating said lever both vertically and laterally, substantially as and for the purpose set forth.

2. The combination of rotary shaft E, fitted to turn in suitable bearings, and cam $E^3$ secured thereon, having the peripheral cam-surface $E^6$ adapted to act on the end $G^3$ of lever G, with said lever G pivoted to a shaft $G'$, and having a wire-gripping device at its opposite end $G^2$, consisting of the plates $G^5$ $G^6$, between which the wire B passes, the guide-plate $G^7$, the slide-block $G^8$, fitted in the guideway $F^{11}$ of bed A, and holding-plate $G^9$ and its screws $G^{10}$ for fastening the plate $G^6$ and slide-block $G^8$ together, substantially as and for the purpose set forth.

3. The combination of rotary shaft E fitted to turn in suitable bearings, and eccentric L secured thereon, with frame $L'$ in which said eccentric turns, frame $L^2 L^3$, fitted to slide longitudinally in a suitable, longitudinal guideway in bed A, spring-catch $L^4$, mounted on said frame, and whose catch $s^2$ is adapted to engage with slide-bar $K^4$; said slide-bar $K^4$, provided with notches $r\ r$ in its top surface, with which said catch $s^2$ is adapted to engage, the adjustable, stationary, lifting-fingers $t$ adapted to also engage with said catch $s^2$, slide-plate $K^2$ attached to the forward end of said slide-bar $K^4$, and fitted to slide in a suitable guideway, cutter K secured to the front end of said slide-plate $K^2$, and adapted to act in conjunction with the stationary cutter $K'$, to sever the piece of wire from which the staple is formed from the main strand, and said stationary cutter $K'$ having a suitable opening therein for the passage of wire B, substantially as and for the purpose set forth.

4. The combination of slide-bar $K^4$ provided with notches $r\ r$ in its top surface with which the catch $s^2$ of the spring-catch $L^4$ may engage to operate the same, with slide-plate $K^2$ attached to the forward end of said slide-bar $K^4$, and fitted to slide in a suitable guideway, also provided with the bevels $w^3 w^3$ at its front end, cutter K secured to the front end of said slide-plate $K^2$, and adapted to act in conjunction with the stationary cutter $K'$ to sever the piece of wire from which the staple is formed from the main strand, said stationary cutter $K'$ having a suitable opening therein for the passage of wire B, and the movable vertical bar or staple-former, $w^4$, around which the severed piece of wire is bent by the bevels on slide-plate $K^2$, to form the staple, substantially as and for the purpose set forth.

5. The combination of bed A and stationary bearing $w^6$, formed or secured thereon, with swing-lever $w^7$, pivoted at one end at $w^8$ to said bearing, vertical bar or staple-former $w^4$ arranged to move up and down in bearing $w^6$ and having a stud or projection $w^9$ against which the lever $w^7$ may impinge to lift said bar or former $w^4$, when the lever is raised, the spring $w^5$ adapted to press downward on the bar or former $w^4$ and the staple-driver M having the raised, beveled portion $M^3$, adapted to engage with the rounded end $w^{10}$ of said lever $w^7$ opposite from its pivoted end, to elevate the same, and also having means connected therewith for imparting intermittent, longitudinal movements thereto, substantially as and for the purpose set forth.

6. The combination of the spring, catch device $L^5$, mounted on the longitudinally-reciprocating frame or carriage $L^2 L^3$, with the longitudinal slide-bar $M'$, fitted to slide in a suitable guideway and having notches $r'$, $r'$ in its top edge for the catch $s^4$ of said catch device $L^5$ to engage with the lever $w^7$; the staple-driver M attached to the front end of said slide-bar $M'$ and over the top edge of which said lever $w^7$ is adapted to slide, when said driver is moved back and forth longitudinally, the driver also being fitted to slide in a suitable guideway and to engage with the staple previously formed and drive it into the edge of one of the slats N, substantially as and for the purpose set forth.

7. The combination of the slide-bar $M'$, having means connected therewith for imparting intermittent longitudinal movements thereto, with the staple-driver M, attached to the forward end of said slide-bar, fitted to slide in a suitable guideway and adapted to engage with the staple previously formed, and drive it into the edge of one of the slats N, the lever $w^7$, pivoted at one end $w^8$ to a stationary bearing $w^6$, and whose opposite free end is adapted to slide over the top edge of said staple-driver M, the vertical bar or former $w^4$, arranged in bearing $w^6$ and having the laterally-projecting stud, $w^9$ for the lever $w^7$ to engage with, between its pivoted end and its free end, which rests on the staple-driver, and the spring $w^5$ also arranged in said bearing $w^6$, and adapted to exert a downward, yielding pressure on the bar or former $w^4$, substantially as and for the purpose set forth.

8. The combination of the slide-bar $M'$ having means connected therewith for imparting intermittent, longitudinal movements thereto, with the staple-driver M fitted to slide in a suitable guideway, and adapted to engage with the staple previously formed, and drive it into the edge of one of the slats N, said staple-driver also being provided with a notch $w^{16}$; the lock-lever $w^{14}$, pivoted to a stationary bearing and adapted to engage with said notch $w^{16}$; the fixed finger $w^{18}$ on slide-plate $K^2$, for engaging the end of lever $w^{14}$ with the staple-driver notch, and the fixed finger $w^{21}$, also on said slide-plate $K^2$ for disengaging said lever $w^{14}$ from the notch $w^{16}$, substantially as and for the purpose set forth.

9. The combination of the longitudinally-reciprocating frame or carriage $L^2 L^3$, with the bifurcated frame $P'$, adjustably secured to the front end thereof, the horizontal longitudinal pusher-plates P P formed upon or secured to said frame P', and adapted to engage with the edge of one of the slats N to push it forward, the longitudinally-sliding slat-conveyer O, suitable spring-pawl devices attached to said pusher-plates P P and adapted to engage with said conveyer, and bed A having suitable supports and guide-ways for said conveyer, substantially as and for the purpose set forth.

10. The combination of the longitudinally-reciprocating frame or carriage $L^2$ $L^3$ and bed A, with the bifurcated frame P', adjustably secured to the front end thereof; the horizontal, longitudinal pusher-plates P P formed upon or secured to said frame P', and adapted to engage with the edge of one of the slats N to push it forward, suitable spring-pawl devices mounted on said pusher-plates and adapted to engage with the slat-conveyer O, said slat-conveyer fitted to slide longitudinally in frame A, and made in a series of separable sections, each section consisting of the side pieces $x$ $x$, the cross connecting-rod $x'$ and plate $x^2$, the hooks $x^3$ $x^3$, adapted to be hooked over the cross-rod $x'$ of the next preceding conveyer-section, the springs $x^4$ $x^4$ for exerting a pressure on said hooks to keep them in engagement with said cross-rod $x'$, and the longitudinal rod N' attached at one end by spurs $x^5$ to the cross-plate $x^2$ and its other end adapted to rest in a longitudinal groove in bed A, substantially as and for the purpose set forth.

11. The mechanism for feeding the wire C into the machine, consisting of the cam T, on rotary shaft $R^2$, lever V, pivoted at V' to a trunnion-bearing, and whose upper end is adapted to engage with the periphery of said cam T, and with the side cam-surface $T^4$ of cam T; trunnion-bearing V', mounted in stationary bearings; and grip device $V^4$ with which the lower end of lever V engages; in combination with the mechanism for clamping and holding said wire C during the operation of cutting the staple-blanks from the main strand, and while said blanks are being bent to form the staples, consisting of the cam T', also on rotary shaft $R^2$, lever W pivoted at W' to the same stationary bearing as lever V, and whose upper end is adapted to engage with the lateral cam-surface $T^5$ of cam T', and wire-clamping block $W^2$ with which the lower end of lever W engages, substantially as and for the purpose set forth.

12. The combination of transverse rotary shaft R fitted to turn in stationary bearings and eccentric $T^3$ secured on said shaft, with frame X fitted to slide vertically in stationary frame X', spring-catch devices $L^6$ $L^7$ mounted on said carriage and adapted to engage with the vertical, slide-bar $X^2$, said slide-bar $X^2$ fitted to slide up and down in a suitable guideway and provided with notches $y$ for said catch devices to engage with and also with the notch $y^2$ at its upper end, the stationary spring-catch $y^3$ adapted to engage with said notch $y^2$ on the slide-bar and provided with the projection $y^5$, the projection $y^4$ on catch device $L^6$ adapted to engage with said projection $y^5$, slide-plate $X^5$ attached to the bottom of slide-bar $X^2$ and fitted to slide vertically in slide-frame $X^7$ also provided with the end bevels $X^{13}$ $X^{13}$, cutter $X^{10}$, secured to the bottom of slide-plate $X^5$, stationary cutter $X^{11}$ adapted to act in conjunction with the movable cutter $X^{10}$ to sever the pieces of wire from which the staples are formed from the main strand C, and the movable, horizontal bar or staple-former $X^{11}$ over which the severed piece of wire is bent by the bevels $X^{13}$ $X^{13}$ to produce the finished staple, substantially as and for the purpose set forth.

13. The combination of the intermittently-reciprocating, vertical slide-bar $X^2$, with the slide-plate $X^5$, attached to the bottom of said slide-bar $X^2$, and fitted to slide up and down in the slide-frame $X^7$, and also provided with the end bevels $X^{13}$ $X^{13}$, cutter $X^{10}$, secured to the bottom end of said slide-plate $X^5$, stationary cutter $X^{11}$, adapted to act in conjunction with the movable cutter $X^{10}$ to sever the pieces of wire from which the staples are formed from the main strand C, slide-frame $X^7$ fitted to slide vertically in stationary frame $X^9$, and provided with the bearing $X^{25}$ at its upper end, said stationary frame $X^9$ and the staple-driver $X^{15}$ adapted to engage at its upper end $X^{24}$, with said bearing $X^{25}$ on the slide-frame $X^7$, substantially as and for the purpose set forth.

14. The combination of the vertically-reciprocating frame X and spring-catches $L^8$ $L^9$, mounted thereon, and adapted to engage with the vertical slide-bar $X^3$, with said slide-bar $X^3$ having suitable notches $y'$ for said spring-catches to engage with, the vertical connecting-bar $X^{15}$ attached to the bottom end of said slide-bar $X^3$, the staple-driver $X^{16}$ in turn secured to the bottom end of said connecting-bar $X^{15}$, and fitted to slide in a suitable guideway in the slide-plate $X^5$ and slide-plate $X^7$, and adapted to engage with the slat-rod staple, and drive said staple into the rod, substantially as and for the purpose set forth.

15. The combination of stationary frame $X^9$ and vertical, slide-frame $X^7$ fitted to slide therein, with the vertical, intermittently-reciprocating, attached, slide-bar $X^3$, connecting-bar $X^{15}$ and staple-driver $X^{16}$ having some portion thereof adapted to engage with said vertical slide-frame $X^7$ to lift the latter, substantially as and for the purpose set forth.

16. The combination of mechanism for holding the slats N in place, consisting of the cam $T^2$ mounted on rotary shaft $R^2$, rock-lever $S^2$ pivoted to a stationary bearing and engaging at its inner end with said cam $T^2$, the vertical slat-holding bar S fitted to slide in suitable bearings and engaging with the outer end of rock-lever $S^2$ and means for exerting a downward pressure thereon, with mechanism for driving the staples into said slats N, consisting of the longitudinally-reciprocating carriage $L^2$, $L^3$, spring-catch device $L^5$, mounted thereon, longitudinal, notched, slide-bar $M'$ fitted to slide in a suitable guideway and with which said catch device $L^5$ is adapted to engage, lever $w^7$, staple-driver M attached to the front end of said slide-bar $M'$ and over the top of which said lever $w^7$ is adapted to slide when said driver is moved forward and back longitudinally, the driver also being fitted to slide in a suitable guideway and to engage with the staples to drive them into the slats, substantially as and for the purpose set forth.

17. The combination of stationary frame $X'$ and vertical bar $X^2$ fitted to slide therein, and having the notches $y$ formed in the same, with the vertically-reciprocating frame X and spring-catch $L^7$, the latter consisting of the casing $s$, the screw-head $s'$ having a longitudinal opening therein, the catch $s^2$ fitted in said casing at the opposite end from said screw-head and whose outer end is provided with the square part $s^4$ and rounded part $s^5$, the spring $s^3$, fitted in the casing between the screw-head and catch $s^2$, and the central rod $s^6$ extending through the screw-head and into said catch $s^2$, substantially as and for the purpose set forth.

ROBERT S. GRIFFIN.
JOHN W. COPELAND.

Witnesses:
A. A. BARKER,
W. B. NOURSE.